United States Patent
Murayama et al.

(10) Patent No.: US 8,032,712 B2
(45) Date of Patent: Oct. 4, 2011

(54) STORAGE SYSTEM FOR STAGING DATA IN RANDOM ACCESS AREA

(75) Inventors: Tomonori Murayama, Yokohama (JP); Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 678 days.

(21) Appl. No.: 12/081,652

(22) Filed: Apr. 18, 2008

(65) Prior Publication Data

US 2009/0228632 A1     Sep. 10, 2009

(30) Foreign Application Priority Data

Mar. 10, 2008 (JP) ................................ 2008-059557

(51) Int. Cl.
*G06F 12/08* (2006.01)
(52) U.S. Cl. ......................... 711/137; 711/158; 711/162
(58) Field of Classification Search .................. None
See application file for complete search history.

(56) References Cited

U.S. PATENT DOCUMENTS

| 2004/0117398 | A1* | 6/2004 | Idei et al. ...................... 707/102 |
| 2006/0123207 | A1  | 6/2006 | Yamamoto et al. |
| 2009/0222453 | A1* | 9/2009 | Naineni ........................ 707/10 |

FOREIGN PATENT DOCUMENTS

JP      2006-163454     12/2004

* cited by examiner

*Primary Examiner* — Gary Portka
(74) *Attorney, Agent, or Firm* — Stites & Harbison PLLC; Juan Carlos A. Marquez, Esq.

(57) ABSTRACT

There is provided a storage system accessed by a host computer, comprising: an interface coupled to the host computer; a processor coupled the interface; a memory coupled to the processor; and a storage device for storing the data. The storage device comprises a first storage device in which the stored data is accessed sequentially from a beginning, and a second storage device in which the stored data can be accessed at random. The data stored in the first storage device is replicated to the second storage device, and the replicated data is accessed by the host computer. The processor receives a candidate of the data including a priority of the data from the host computer, and replicates the data included in the candidate of the data, and stored in the first storage device to the second storage device in accordance with the priority before reception of an access request.

13 Claims, 10 Drawing Sheets

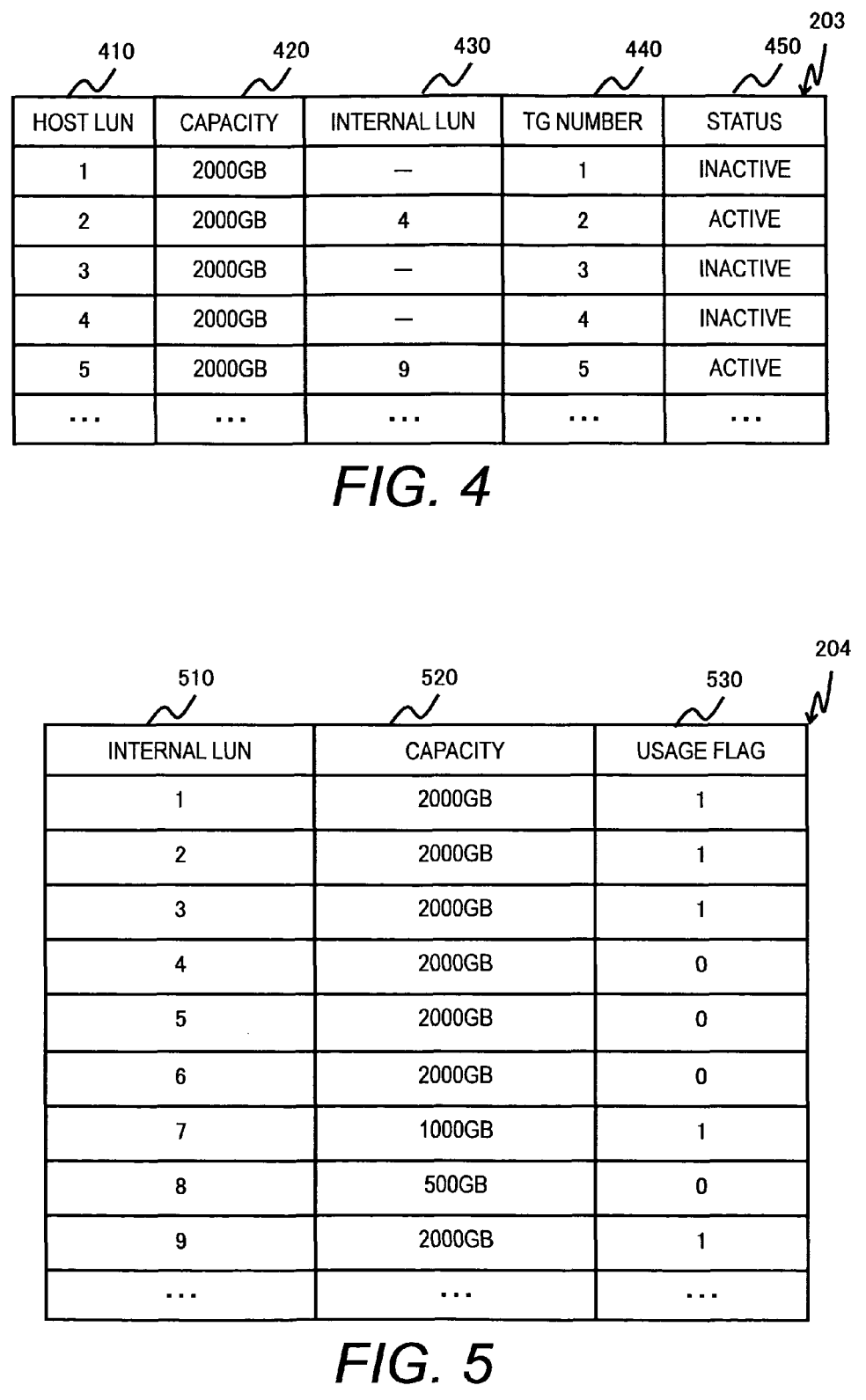

| HOST LUN | CAPACITY | INTERNAL LUN | TG NUMBER | STATUS |
|---|---|---|---|---|
| 1 | 2000GB | — | 1 | INACTIVE |
| 2 | 2000GB | 4 | 2 | ACTIVE |
| 3 | 2000GB | — | 3 | INACTIVE |
| 4 | 2000GB | — | 4 | INACTIVE |
| 5 | 2000GB | 9 | 5 | ACTIVE |
| ... | ... | ... | ... | ... |

FIG. 4

| INTERNAL LUN | CAPACITY | USAGE FLAG |
|---|---|---|
| 1 | 2000GB | 1 |
| 2 | 2000GB | 1 |
| 3 | 2000GB | 1 |
| 4 | 2000GB | 0 |
| 5 | 2000GB | 0 |
| 6 | 2000GB | 0 |
| 7 | 1000GB | 1 |
| 8 | 500GB | 0 |
| 9 | 2000GB | 1 |
| ... | ... | ... |

FIG. 5

| TG NUMBER | USAGE FLAG | TAPE NUMBER |
|---|---|---|
| 1 | 1 | 1,2,3 |
| 2 | 1 | 4 |
| 3 | 0 | - |
| 4 | 0 | - |
| 5 | 1 | 5,6 |
| 6 | 1 | 20 |
| 7 | 1 | 60 |
| 8 | 0 | - |
| 9 | 0 | - |
| ... | ... | ... |

*FIG. 6*

SEARCH RESULT DISPLAY SCREEN

| CONTENT NAME | SIZE [kB] | DATE OF UPDATE | STATUS |
|---|---|---|---|
| C10 | 1,600 | 2007/04/26 | ACTIVE |
| C55 | 500 | 2007/02/19 | ACTIVE |
| C80 | 4,525 | 2007/01/10 | ACTIVE |
| C1 | 300 | 2006/09/23 | INACTIVE |
| C3 | 850 | 2006/09/20 | INACTIVE |
| C5 | 3,563 | 2005/03/25 | INACTIVE |
| C6 | 286 | 2006/09/15 | INACTIVE |

*FIG. 11*

STORAGE SYSTEM FOR STAGING DATA IN RANDOM ACCESS AREA

CLAIM OF PRIORITY

The present application claims priority from Japanese patent applications JP 2008-59557 filed on Mar. 10, 2008, the content of which are hereby incorporated by reference into this application.

BACKGROUND

This invention relates to a technology for a tape archive of data.

Government organizations, business enterprises, educational institutes, and the like, in order to handle various types of large amounts of data, employ a relatively large-scale storage system in order to manage the data. The storage system of this type includes at least one storage control device. The storage control device, for example, includes a large number of storage devices, and can provide a storage area in a form of the redundant array of inexpensive disks (RAID). On the physical storage area provided by the group of the storage devices, at least one logical device (also referred to as logical volume) is formed. A host computer (hereinafter referred to as host) issues a write command and a read command to the logical device, thereby writing and reading data to and from the logical device.

A virtual disk library system, which is a type of the storage control device, includes hard disk devices and magnetic tape devices stored in an enclosure, and can copy data, if necessary, between the hard disk and the magnetic tape media, refer to JP 2006-163454 A.

SUMMARY

The amount of data, which have to be maintained for a long period due to regulations, is increasing day by day. In order to preserve a large amount of data for a long period, it is preferable to employ as inexpensive storage devices as possible. It is possible to reduce the cost for the storage of data, which are infrequently used, for a long period by recording the data on a magnetic tape device, which is more inexpensive than a hard disk device in terms of cost per bit.

On this occasion, as a method for an access to data stored on a tape media, a pre-preparation method copies a volume of data as a unit from the tape media to a disk device, and provides a host with the data for the access, which have been copied to the disk device. According to the pre-preparation method, if data to be accessed is stored on the tape media, a user or an administrator searches for the data, copies the searched data from the tape media to the disk device, which is referred to as staging, and, on the completion of the staging, can make access to the data. Therefore, before making access to the data stored on the tape media, the user or the administrator has to instruct staging, resulting in a period before the data becomes available for the access.

Moreover, the pre-preparation method requires a three-step procedure for the access to the data stored on the tape media, which includes the identification of data to be accessed, the instruction of the staging of the data, and the instruction of the data access. Compared with the access to data stored in a disk device with a two-step procedure including the identification of the data to be accessed and the instruction of the data access, the pre-preparation method is complicated in terms of the access procedure.

This invention has been made in view of the above problem, and therefore has an object to provide a storage system which simplifies the access procedure required for a user or an administrator who wants to make an access to data stored on a tape media, thereby reducing a period required before the data is accessed.

A representative aspect of this invention is as follows. That is, there is provided a storage system for storing data accessed by a host computer, comprising: an interface coupled to the host computer; a processor coupled the interface; a memory coupled to the processor; and a storage device for storing the data. The storage device comprises a first storage device in which the stored data is accessed sequentially from a beginning, and a second storage device in which the stored data can be accessed at random. The data stored in the first storage device is replicated to the second storage device, and the replicated data is accessed by the host computer. The processor receives a candidate of the data including a priority of the data from the host computer, and replicates the data included in the candidate of the data, and stored in the first storage device to the second storage device in accordance with the priority before reception of an access request.

According to the aspect of this invention, it is possible to reduce a period required for an access to data stored in a storage device in which data is sequentially accessed such as a magnetic tape media by replicating the data to a storage device in which data can be accessed at random such as a hard disk drive in advance, which simplifies the access procedure.

BRIEF DESCRIPTION OF THE DRAWINGS

The present invention can be appreciated by the description which follows in conjunction with the following figures, wherein:

FIG. 4 is an explanatory diagram showing a configuration example of a virtual volume management table in accordance with the embodiment of this invention;

FIG. 5 is an explanatory diagram showing a configuration example of a disk pool management table in accordance with the embodiment of this invention;

FIG. 6 is an explanatory diagram showing a configuration example of a TG pool management table in accordance with the embodiment of this invention;

FIG. 11 is an explanatory diagram showing an example of a screen showing a search result in accordance with the embodiment of this invention.

DETAILED DESCRIPTION OF THE PREFERRED EMBODIMENT

A description will now be given of an embodiment of this invention with reference to the drawings.

Figure 1:
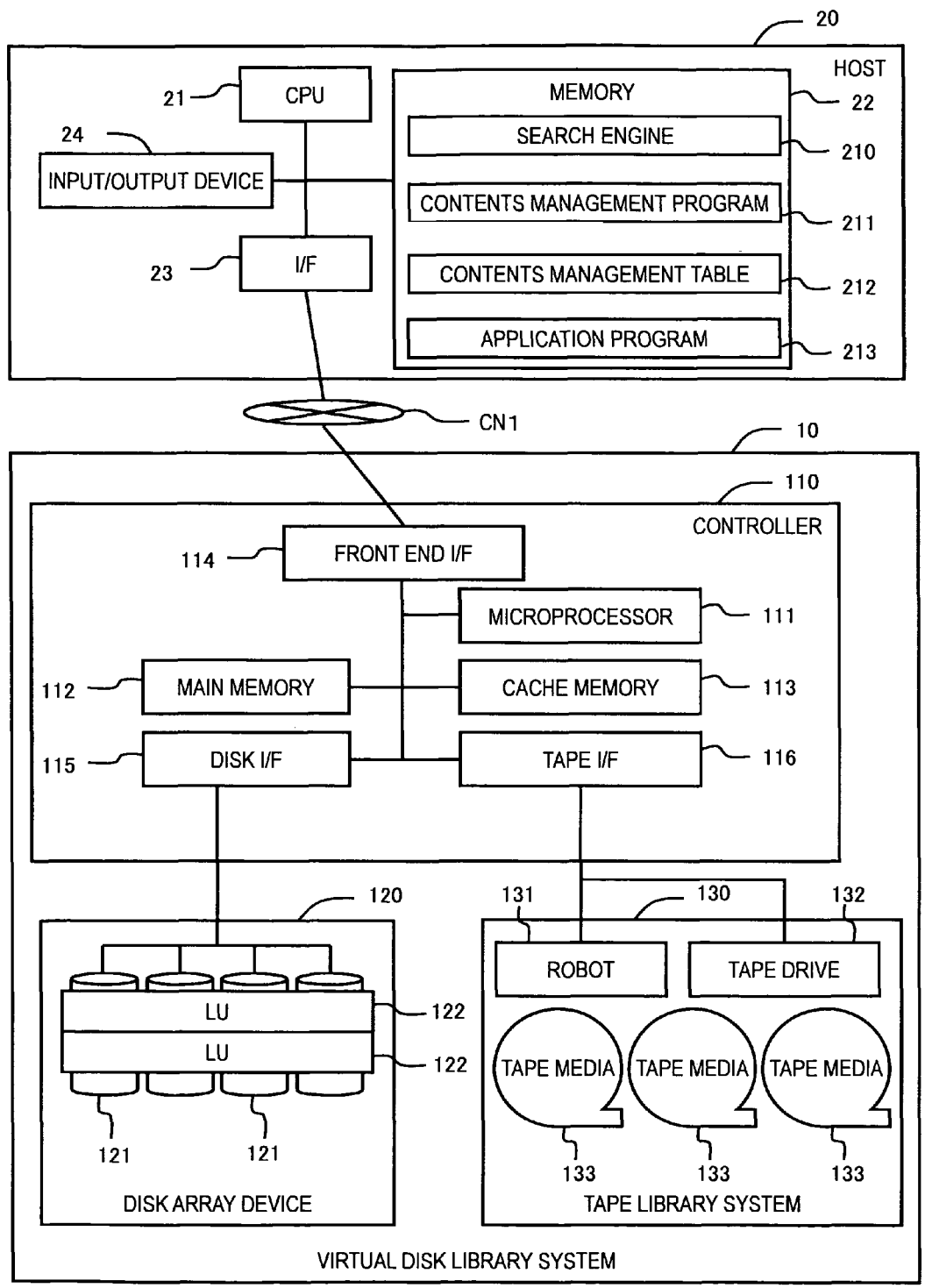
FIG. 1 is a block diagram showing an example of a configuration of a computer system in accordance with an embodiment of this invention.

FIG. 1 is a diagram showing an example of a configuration of a computer system according to the embodiment of this invention.

The computer system according to the embodiment of this invention includes a virtual disk library system 10 and a host computer 20. The virtual disk library system 10 and the host computer 20 are coupled with each other via a communication network CN1.

The host computer 20 carries out various business processes according to instructions from a user. The host computer 20 is configured as a computer device such as a mainframe computer, a server computer, a workstation, or a personal computer.

The host computer 20 includes a microprocessor (CPU) 21, a memory 22, a communication interface (I/F) 23, and an input/output device 24.

The CPU 21 executes predetermined processes according to programs stored in the memory 22. The memory 22 stores the programs executed by the CPU 21, and data required for the execution of these programs. The memory 22 stores a search engine 210, a contents management program 211, a contents management table 212, and an application program 213. The memory 22 also stores various driver software programs which are not included within the gist of this invention, and hence description thereof is omitted.

The search engine 210 is a program which receives entered search conditions, and then searches for data (content) which meet the entered search conditions. The contents management program 211 is a program which manages arrangements and states of content data used by the application program 213. The search engine 210 and the contents management program 211 can issue an inactivate command and an activate command, which will be described later, to the virtual disk library system 10.

The contents management table 212 stores data required for management of contents. For example, the stored data include keywords used for a search for contents. A detailed description will later be given of the contents management table 212 with reference to FIG. 7. The application program 213 is a program which provides users with predetermined services. According to the embodiment of this invention, the application program 213 provides the predetermine services by using the search engine 210 to obtain necessary contents.

The I/F 23 is coupled to the virtual disk library system 10 via the communication network CN1.

The communication network CN1 is a fibre channel-storage area network (FC-SAN), an Internet protocol-SAN (IP-SAN), a local area network (LAN), or the like.

Moreover, when the host computer 20 is a mainframe computer, communication protocols such as fibre connection (hereinafter, FICON, registered trademark), enterprise system connection (hereinafter, ESCON, registered trademark), advanced connection architecture (hereinafter, ACONARC, registered trademark), and fibre connection architecture (hereinafter, FIBARC, registered trademark) are used. When the host computer 20 is a server computer, a personal computer, or the like, communication protocols such as transmission control protocol/Internet protocol (TCP/IP), fibre channel protocol (FCP), and Internal small computer system interface (iSCSI) are used.

The virtual disk library system 10 includes a controller 110, a disk array device 120, and a tape library system 130. The controller 110, the disk array device 120, and the tape library system 130 may be installed in the same package, or may be installed in separate packages.

The controller 110 controls processes carried out in the virtual disk library system 10. The controller 110 includes a microprocessor 111, a main memory 112, a cache memory 113, a front-end communication interface 114, a disk interface 115, and a tape interface 116.

The microprocessor 111 executes programs stored in the main memory 112, thereby providing predetermined functions. For example, the microprocessor 111 provides a function of generating a virtual volume, a function of transporting data, and the like. The main memory 112 stores the programs executed by the microprocessor 111, and data required for the execution of these programs. A description will later be given of the programs and data stored in the main memory 112 with reference to FIG. 2.

The cache memory 113 stores write data received from the host computer 20, data read from a logical disk device (hereinafter referred to as disk device), and the like.

The front-end communication interface 114 is an interface used for communication with the host computer 20. The disk interface 115 is an interface for communication of data with respective disk devices 122 in the disk array device 120. The tape interface 116 is an interface for communication of data with respective tape devices 133 in the tape library system 130.

The disk array device 120 includes a plurality of disk drives 121. It is possible to construct a RAID group using physical storage areas individually provided by the disk drives 121. The logical disk devices (LU's) 122 of a fixed size or a variable size can be provided in a physical storage area of the RAID group. Moreover, one or more logical disk devices 122 can be provided in a physical storage area of a single disk drive 121.

The disk device 122 is an example of a random access storage device. As the disk drives 121 which provide the disk devices 122, hard disk devices can be used, for example. Specifically, a fibre channel (FC) disk device, a small computer system interface (SCSI) disk device, an SATA disk device, an AT attachment (ATA) disk device, a serial attached SCSI (SAS) disk device, and the like can be used as the disk drive 121. Moreover, the disk drive 121 is not limited to the hard disk device, and various random access storage devices such as a flash memory device, a magnetic optical disk, an optical disk, a ferroelectric random access memory (Fe-RAM), a magnetoresistive random access memory (MRAM), an ovonic unified memory, and a resistance RAM (RRAM) may be used as the disk drive 121. The hard disk device is employed as an example of the random access storage device, but this invention is not limited to the hard disk device. Another random access storage device such as a flash memory device may be employed, or both the hard disk device and the flash memory device may be employed at the same time.

The tape library system 130 includes a robot 131, a tape drive 132, and a plurality of tape devices 133.

The robot 131 controls transportation of the tape devices 133. The robot 131 mounts the tape device 133 on the tape drive 132, and dismounts the tape device 133 from the tape drive 132 to be stored in a predetermined location.

The tape drive 132 writes data to the tape device 133, and reads data from the tape device 133. The tape device 133 stores data on a magnetic tape media. Moreover, the tape device 133 is a sequential access storage device, which requires a reading of data from the beginning of the magnetic tape media to a location where data to be read is stored.

Figure 2:
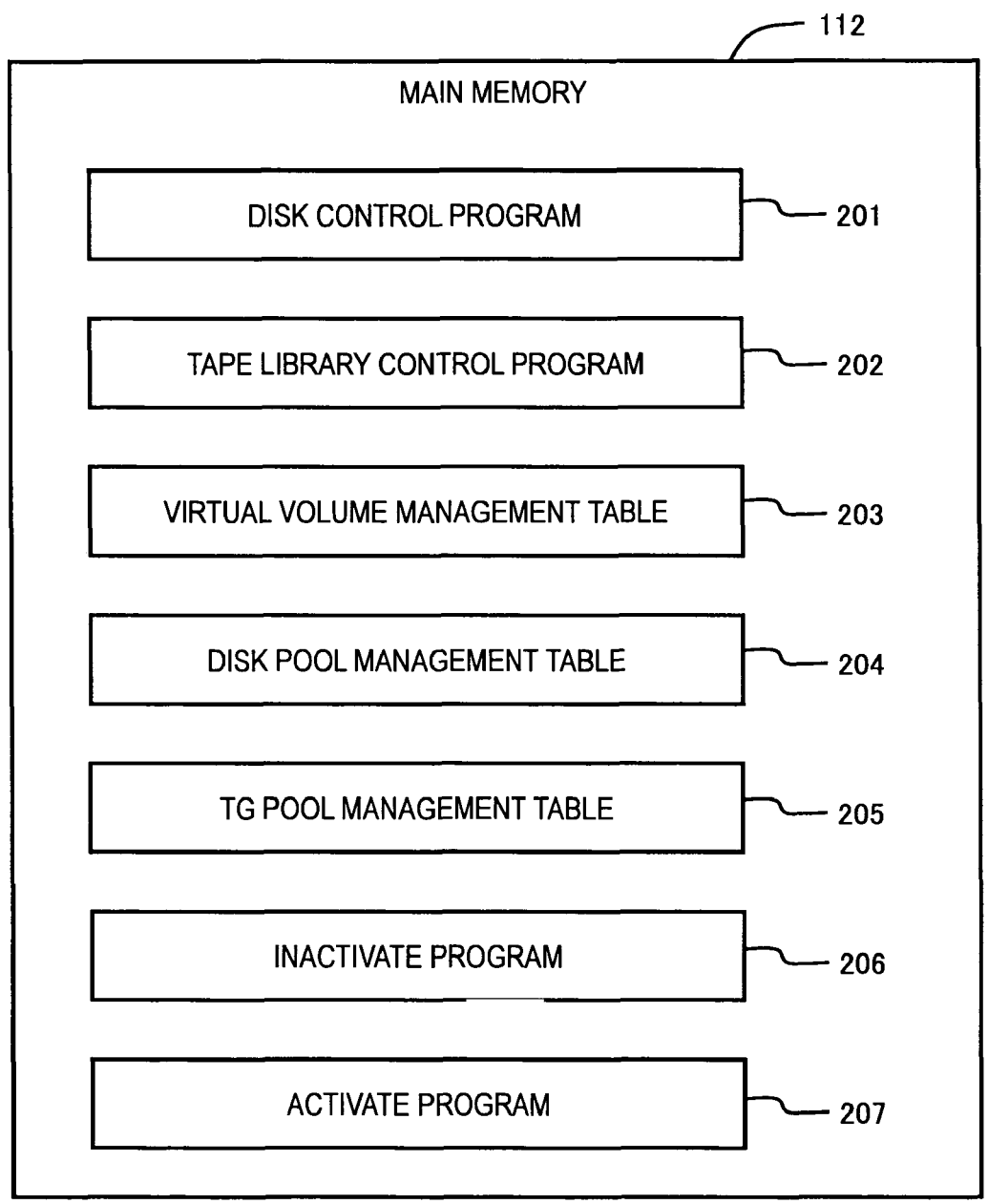
FIG. 2 is a block diagram showing an example of programs and information stored in a main memory of a virtual disk library system in accordance with the embodiment of this invention.

FIG. 2 shows an example of programs and information stored in the main memory 112 of the virtual disk library system 10 according to the embodiment of this invention.

The main memory 112 stores a disk control program 201, a tape library control program 202, a virtual volume management table 203, a disk pool management table 204, a tape group (TG) pool management table 205, an inactivate program 206, and an activate program 207.

Before a description of these respective components, a description will now be given of relationships among virtual volumes 6, a disk pool 4, and a tape group (TG) pool 5 with reference to FIG. 3.

Figure 3:
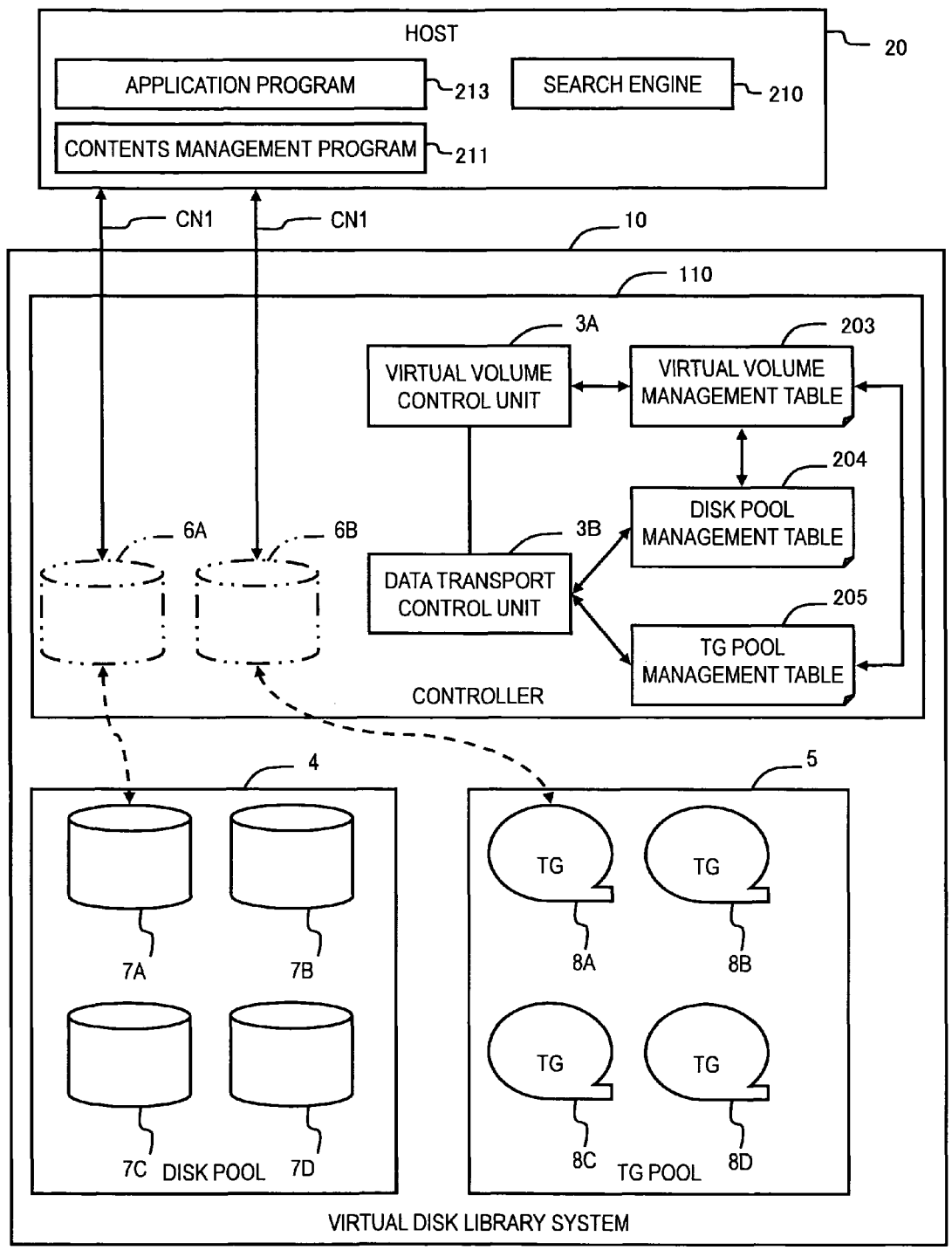
FIG. 3 is an explanatory diagram showing relationships among virtual volumes, a disk pool and a TG pool in accordance with the embodiment of this invention.

FIG. 3 describes the relationships among the virtual volumes 6, the disk pool 4, and the TG pool 5 according to the embodiment of this invention. It should be noted that FIG. 3 illustrates two virtual volumes 6A and 6B, and if it is not necessary to distinguish these volumes 6A and 6B, they are generally refereed to as virtual volume 6.

The controller 110 generates the virtual volume 6, provides the host computer 20 with generated volume 6, and processes a data input/putout request (I/O request) received from the host computer 20. The controller 110 includes a virtual volume control unit 3A, a data transport control unit 3B, a virtual volume management table 203, a disk pool management table 204, and a tape group (TG) pool management table 205.

The disk pool 4 manages a plurality of disk devices 7A to 7D. These disk devices 7A to 7D are generally referred to as disk device 7. The disk device 7 is a logical disk device constituted by a storage area provided by one or more hard disk devices. The disk device 7 corresponds to the logical disk device (LU) 122 of FIG. 1. The disk device 7 may be sometimes referred to as a logical volume.

The TG pool 5 manages a plurality of tape groups 8A to 8D. According to a size of data to be archived, one or more tape devices 133 are combined into a group, and the group is used a tape group 8. In other words, one set of tape devices 133 store data to be archived. In the embodiment of this invention, the magnetic tape device is employed as an example of the sequential access storage device, but this invention is not limited to the magnetic tape device.

The virtual volume 6 is a logical volume constructed virtually. To the virtual volume 6, when a status thereof is active, the disk device 7 is allocated, and when the status thereof is inactive, the tape group 8 is allocated. In FIG. 3, the virtual volume 6A is active, and the virtual volume 6B is inactive. In other words, the virtual volume 6, according to a change in status, can store data stored therein in the disk device 7 or in the tape group 8.

A description will now be given of a configuration of the controller 110.

The virtual volume control unit 3A has the function of generating the virtual volume 6, and providing the host computer 20 with the generated virtual volume 6. The virtual volume control unit 3A manages the virtual volumes 6 based on the virtual volume management table 203. The virtual volume control unit 3A is realized by the disk control program 201 shown in FIG. 2.

The data transport control unit 3B has a function of, upon a change in status of the virtual volume 6, moving data between the disk device 7 and the tape group 8. The data transport control unit 3B uses the disk pool management table 204 used for managing the disk pool 4, and the TG pool management table 205 used for managing the TG pool 5. The data transport control unit 3B is realized by the tape library control program 202, the inactivate program 206, and the activate program 207.

The data transport control unit 3B transports data in two modes. In the first mode, the data transport control unit 3B receives an inactivate command from the host computer 20, and then, moves data from the disk device 7 to the tape group 8. In the second mode, the data transport control unit 3B receives an activate command from the host computer 20, and then, moves data from the tape group 8 to the disk device 7.

The first mode is a mode in which data which the host computer 20 no longer uses is moved from the disk device 7 to the tape group 8, thereby releasing an actual storage area of the disk device 7 for reuse. The first mode may sometimes be referred to as inactive mode or storage mode. When, as a result of a change to the first mode, data in the virtual volume 6 is moved from the actual storage area of the disk device 7 to the tape group 8, the state of this virtual volume 6 is set to inactive. In the inactive state, data exists only in the tape group 8, and access to the data is not to be received from the host computer 20.

The second mode is a mode in which data stored in the tape group 8 is moved (replicated) to the disk drive 7, thereby enabling access from the host computer 20. The second mode may sometimes be referred to as active mode or recovery mode.

The data transport control unit 3B manages the data transport between the disk device 7 and the tape group 8 by employing the disk pool management table 204 and the TG pool management table 205.

Since the controller 110 recognizes the states of the content data according to the contents management program 211, if the host computer 20 tries to make access to inactive data, the controller 110 denies the access, and notifies the host computer 20 of an error.

When the host computer 20 executes the search engine 210 or the contents management program 211, and tries to use data which has moved to the tape group 8, the host computer 20 issues the activate command to the controller 110. The activate command is a command to move data stored in the tape group 8 to the disk device 7, thereby making the data available for access from the host computer 20. The activate command corresponds to a "recovery instruction".

When the controller 110 receives the activate command, the data transport control unit 3B prepares a free disk device 7 for the data transport, and reads content data from a tape group 8. The read data is stored in the free disk device 7.

The virtual volume control unit 3A allocates the disk device 7 storing the content data to a virtual volume 6. The host computer 20 can now make access to the virtual volume 6, and can use the content data.

Now, a description will return to FIG. 2 again.

As described above, the virtual disk library system 10 provides the host computer 20 side (such as the contents management program 211) with a virtual volume 6 by executing the disk control program 201 (virtual volume control unit 3A), thereby using the virtual volume management table 203, the disk pool management table 204, and the TG pool management table 205. The disk control program 201 further has a function of controlling the disk devices 122.

The tape library control program 202 is a program for controlling the tape library system 130. When data is copied between a disk device 122 and a tape device 133, the inactivate program 206 or the activate program 207 is executed. In the inactivate process and the activate process, in order to write data to the tape device 133 or to read data from the tape device 133, the tape library control program 202 is used. According to needs, the inactivate program 206 and the activate program 207 properly execute the tape library control program 202. It should be noted that, in the following description of the inactivate process and the activate process, a description of the execution of the tape library control program 202 will be omitted.

The inactivate program 206 has a function of, in cooperation with the disk control program 201 and the tape library control program 202, copying data stored in a disk device 122 to a tape device 133.

The activate program 207 has a function of, in cooperation with the disk control program 201 and the tape library control program 202, copying data stored in a tape device 133 to a disk device 122.

FIG. 4 shows a configuration example of the virtual volume management table 203 according to the embodiment of this invention.

The virtual volume management table 203 stores information used for managing a disk device 7 allocated as an actual storage area to a virtual volume 6 and a tape group 8. The virtual volume management table 203 stores, for the respective virtual volumes 6, a host LUN 410, a capacity 420, an internal LUN 430, a TG number 440, and a status 450.

The host LUN 410 is also referred to as a host logical unit number, and is an identifier for uniquely identifying a logical volume provided by the disk control program 201 for the host computer 20. According to this embodiment, a virtual volume 6 is provided for the host computer 20 as a logical volume.

The capacity 420 is a storage capacity of the virtual volume 6.

The internal LUN 430 is an identifier for identifying a disk device 7 associated with the virtual volume 6. The internal LUN 430 is determined by executing the disk control program 201, for example. A correspondence between an internal LUN 430 and a disk device 7 may not be one-to-one correspondence, a plurality of internal LUN's 430 may be allocated to a single disk device 7 or a signal internal LUN 430 may be allocated across a plurality of disk devices 7.

The TG number 440 is an identifier for uniquely identifying a tape group 8. The TG number 440 records a TG number associated with the virtual volume 6.

The status 450 stores information indicating a storage destination of data in each virtual volume 6. In other words, the status 450 stores information which indicates whether a disk device 7 or a tape group 8 is allocated to each virtual volume 6. The status 450 of a virtual volume 6 associated with a disk device 7 is "ACTIVE", and the status 450 of a virtual volume 6 associated with a tape group 8 is "INACTIVE".

When the host computer 20 issues a read command or a write command to a virtual volume 6 in the active state, the controller 110 responds to the host computer 20 normally. On the other had, when the host computer 20 issues a read command or a write command to a virtual volume 6 in the inactive state, the controller 110 notifies the host computer 20 of an error.

FIG. 5 shows a configuration example of the disk pool management table 204 according to the embodiment of this invention.

The disk pool management table 204 stores information used for managing allocation of a disk device 7 to a virtual volume 6. When the activate process is executed, a disk device 7 which is not allocated to a virtual volume 6 is allocated to a virtual volume 6. The disk pool management table 204 stores, for the respective disk devices 7, an internal LUN 510, a capacity 520, and a usage flag 530.

The internal LUN 510 is an identifier for identifying a disk device 7. The capacity 520 is a storage capacity of the disk device 7.

The usage flag 530 is a flag indicating a usage of the disk device 7. Specifically, the usage flag 530 indicates whether the disk device 7 is allocated to a virtual volume 6 or not by two values of "1" and "0". If the disk device 7 is allocated to a virtual volume 6, the usage flag 530 is "1", and if the disk device 7 is not allocated to a virtual volume 6, the usage flag 530 is "0".

FIG. 6 shows a configuration example of the TG pool management table 205 according to the embodiment of this invention.

The TG pool management table 205 stores information used for managing allocations of a tape group 8 to a virtual volume 6. When the inactivate process is executed, a tape group 8, which is not presently allocated to a virtual volume 6, is allocated to a virtual volume 6. The TG pool management table 205, for the respective tape groups 8, stores a TG number 610, a usage flag 620, and a tape number 630.

The TG number 610 is an identifier for identifying a tape group 8.

The usage flag 620 is information indicating a usage of the tape group 8. The usage flag 620 indicates whether the tape group 8 is allocated to a virtual volume 6 or not by two values of "1" and "0". If the tape group 8 is allocated to a virtual volume 6, the usage flag 620 is "1", and if the tape group 8 is not allocated to a virtual volume 6, the usage flag 620 is "0".

The tape number 630 is an identifier for identifying a tape device 133. The tape number 630 stores a tape number of a tape device 133 allocated to the tape group 8. It should be noted that, to a single tape group 8, a single tape device 133 may be allocated, or a plurality of tape devices 133 may be allocated.

Figure 7:
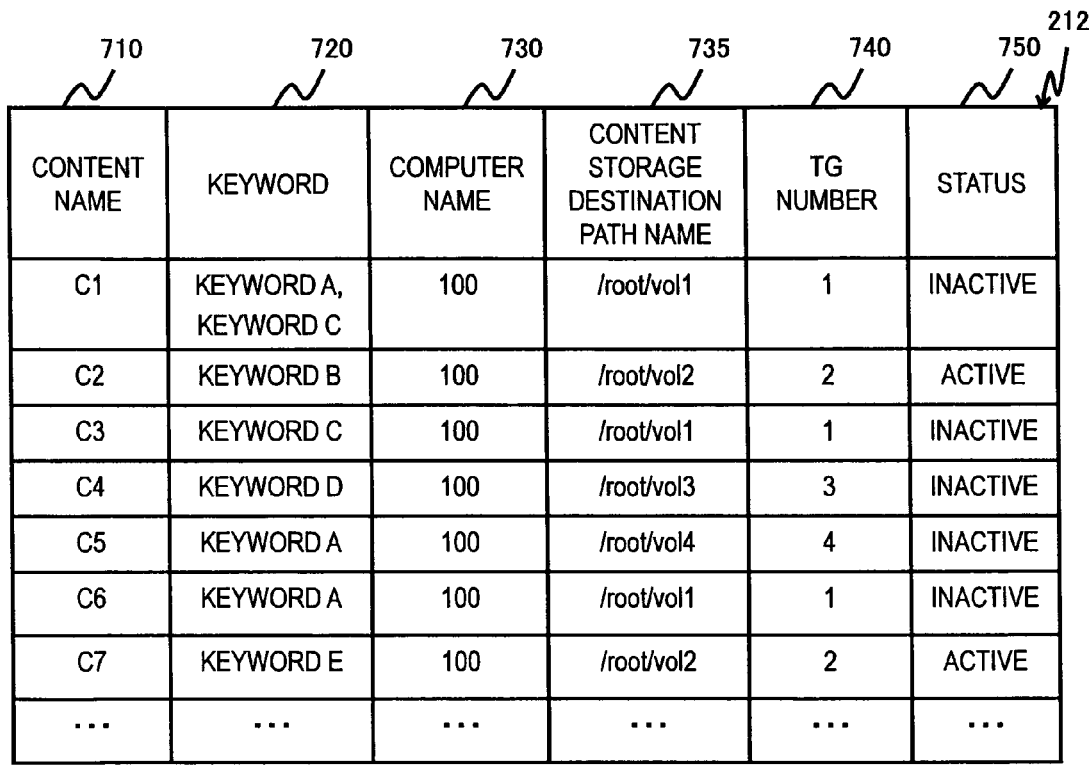
FIG. 7 is an explanatory diagram showing a configuration example of a contents management table in accordance with the embodiment of this invention.

FIG. 7 shows a configuration example of the contents management table 212 according to the embodiment of this invention.

The contents management table 212 stores information used for managing content data when the contents management program 211 is executed. Content data is simply referred to as content hereinafter. A content is a unit of data used by a user on the host computer 20. A content may be a file or data in a database.

The contents management table 212 stores a content name 710, a keyword 720, a computer name 730, a content storage destination path name 735, a TG number 740, and a status 750.

The content name 710 may be any name which can uniquely identify a content when the contents management program 211 is executed.

The keyword 720 is a keyword used by the search engine 210 for a search. A key word may be registered by a user as a keyword for a search, or may be automatically generated by the contents management program 211 from a content.

The computer name 730 is an identifier for uniquely identifying a computer (such as the host computer 20) which is storing the content. It should be noted that the content need not be stored in a computer identified by the computer name 730, but may be stored in a storage area provided by an external storage device mounted to the computer.

The content storage destination path name 735 is information for identifying a volume on the computer which is storing the content. For example, to a volume vol1 of the host computer 20, a disk drive (LU) which corresponds to a virtual volume 6 of the virtual disk library system 10, and is storing a content is mounted.

The TG number 740 indicates a tape group 8 storing the content.

The status 750 is information indicating an actual storage location of the each content. When the actual storage location of the content is a disk device 7, the status 750 is set to "ACTIVE". On the other hand, when the actual storage location of the content is a tape group 8, the status 750 is set to "INACTIVE".

According to the embodiment of this invention, the content storage location (computer name 730 and the content storage destination path name 735) and the TG number 740 are managed based on the contents management table 212, and further, information on the content storage location and the TG number 740 is exchanged by the communication between the host computer 20 and the virtual disk library system 10. Therefore, when the contents management program 211 is executed, by referring to the contents management table 212, it is possible to recognize a logical address of a virtual volume 6 and a tape group 8 storing each content.

When the host computer 20 issues a read command or a write command to a virtual volume 6 in the inactive state, the controller 110 notifies the host computer 20 of an error. It should be noted that there may be provided such a configuration that the contents management program 211 prohibits access to a content in the inactive state.

There may be provided a configuration that the TG number 740 and the status 750 are updated by a communication between the host computer 20 and the virtual disk library system 10 after the process by the inactivate program 206 or the activate program 207 has been completed.

The status 750 is used by the contents management program 211 for showing a user whether respective contents are stored in a disk device 122 or a tape device 133, and the like. Moreover, the contents management table 212 is used as index information when the search engine 210 carries out a search.

Figure 8:
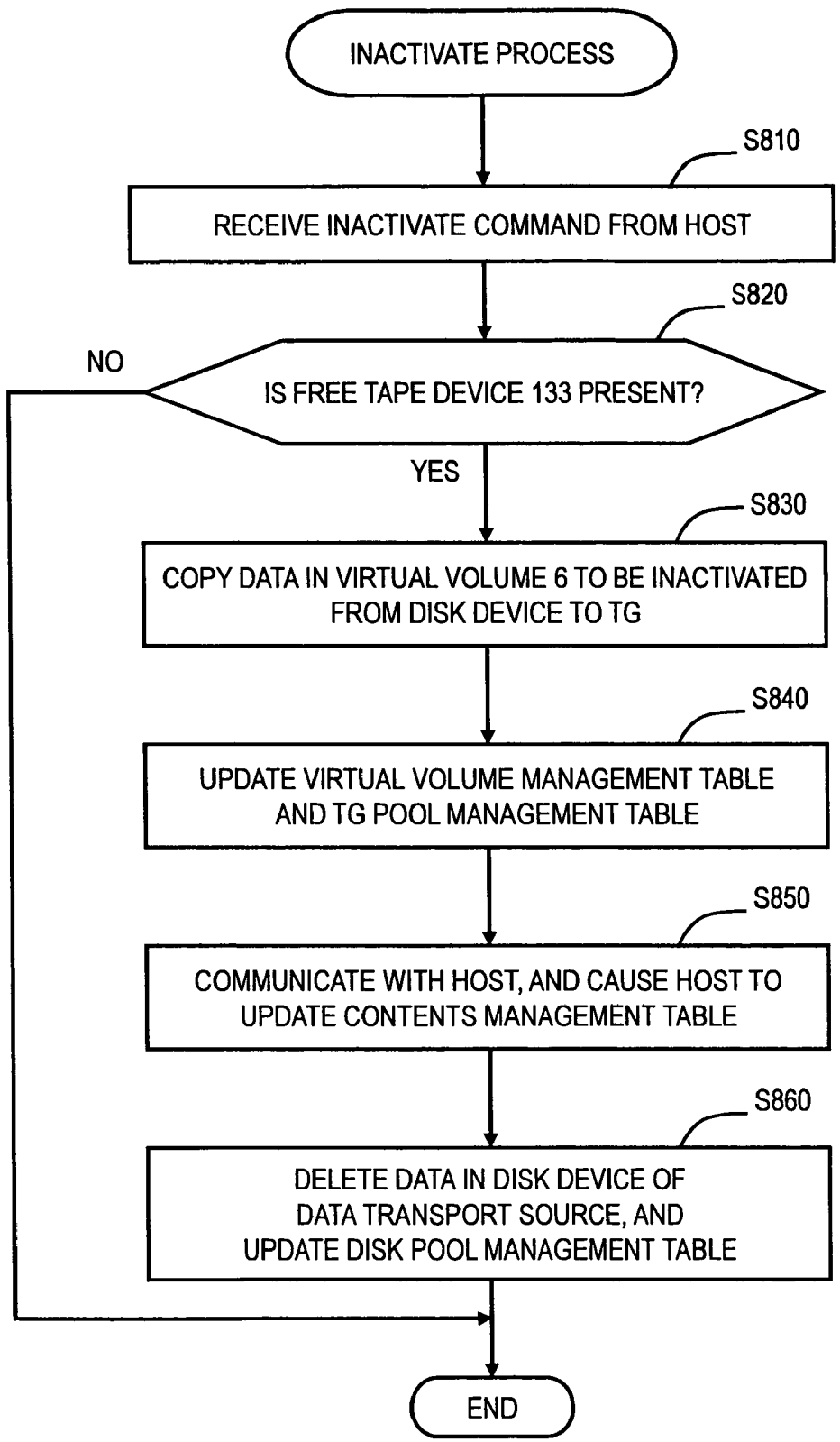
FIG. 8 is a flowchart showing steps of an inactivate process in accordance with the embodiment of this invention.

FIG. 8 is a flowchart showing steps of the inactivate process according to the embodiment of this invention.

The inactivate process is carried out by the inactivate program 206. The inactivate process is a process in which, when the virtual disk library system 10 receives an inactivate command from the host computer 20, the inactivate program 206 moves data stored in a virtual volume 6 in the active state from a disk device 7 to a tape group 8, and changes the status of the virtual volume 6 from the active state to the inactive state.

The CPU 21 of the host computer 20 specifies a host LUN of a virtual volume 6 to be inactivated to issue an inactivate command to the virtual disk library system 10. When the controller 110 receives the inactivate command (S810), the controller 110 determines whether there is a free tape device 133 to store data stored in the disk device 7 (S820).

If there is not a free tape device 133 ("NO" in the step S820), the controller 110 notifies the host computer 20 of an error, and finishes this process.

If there is a free tape device 133 ("YES" in the step S820), the controller 110 transports and copies the data stored in the disk device 7, which is the source of the data transport, to the tape device 133, which is the destination of the data transport (S830).

The controller 110 updates each of the virtual volume management table 203 and the TG pool management table 205 (S840). Specifically, in the virtual volume management table 203, an allocation to the internal LUN 430 is released, and the status 450 is changed to INACTIVE. In the TG pool management table 205, if the usage flag 620 of the TG 8 of the destination of the data transport is "0", the controller 110 changes the usage flag 620 to "1". Moreover, the controller 110 registers the tape number of a tape media, which is used for the data copy, to the tape number 630.

The controller 110 communicates with the host computer 20, and causes the host computer 20 to update the contents management table 212 (S850). The CPU 21 of the host computer 20 executes the contents management program 211, thereby, in the contents management table 212, registering the TG number of the TG 8 storing the content (data) to the TG number 740, and changes the status 750 to "INACTIVE".

The controller 110 deletes the data in the disk device 7, which is the source of the data transport, and sets the usage flag 530 in the disk pool management table 204 to "0" (S860).

Figure 9:
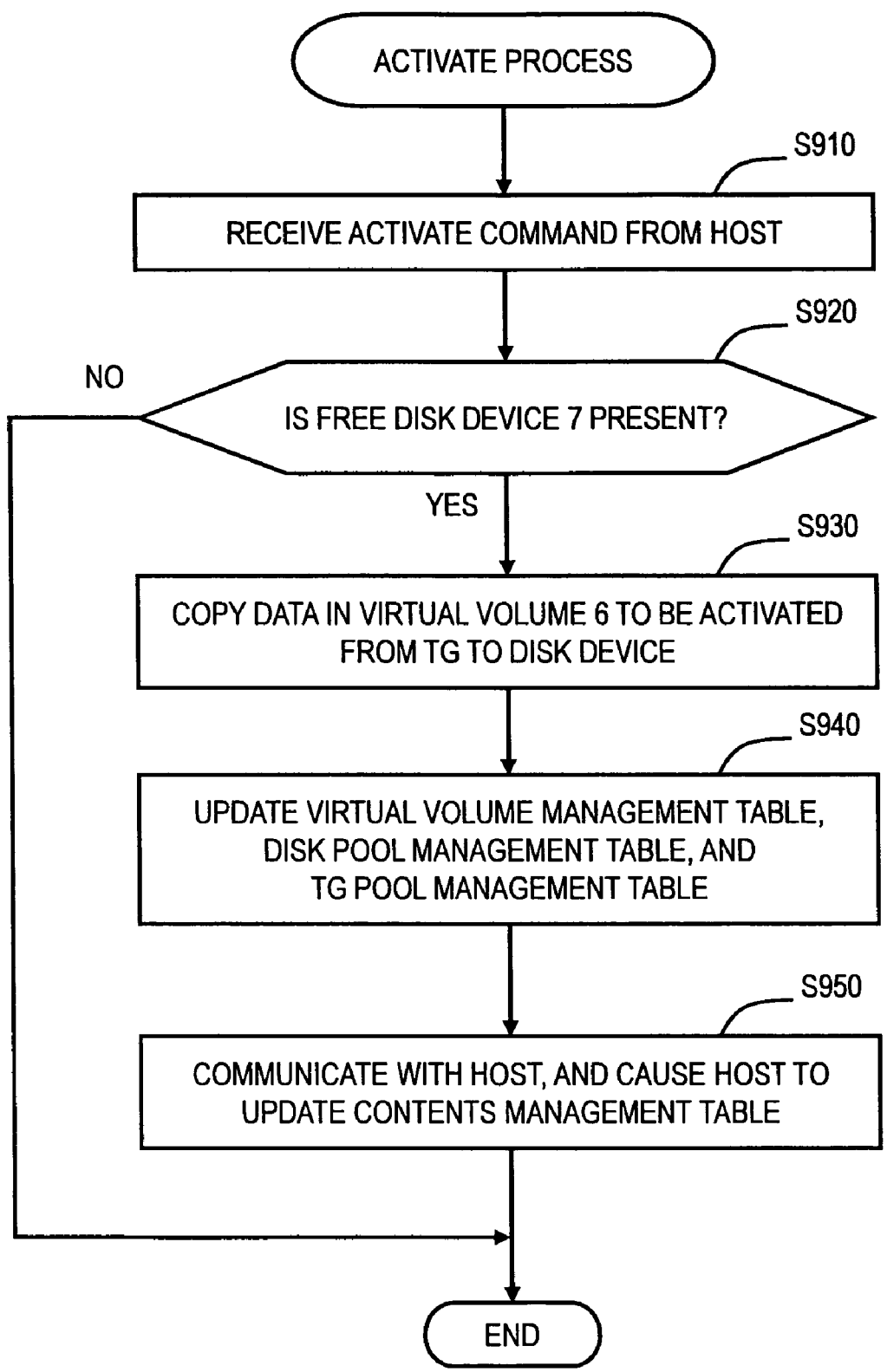
FIG. 9 is a flowchart showing steps of an activate process in accordance with the embodiment of this invention.

FIG. 9 is a flowchart showing steps of the activate process according to the embodiment of this invention.

The activate process is carried out by the activate program 207. The activate process is a process in which, when the virtual disk library system 10 receives an activate command from the host computer 20, the activate program 206 moves data stored in a virtual volume 6 in the inactive state from a tape group 8 to a disk device 7, and changes the status of the virtual volume 6 from the inactive state to the active state.

The CPU 21 of the host computer 20 specifies the TG number of the TG 8 to be activated to issue an activate command to the virtual disk library system 10. When the controller 110 receives the activate command (S910), the controller 110 determines whether there is a free disk device 7 to store data read from the TG 8 (S920).

If there is not a free disk device 7 ("NO" in the step S920), the controller 110 notifies the host computer 20 of an error, and finishes this process.

If there is a free disk device 7 ("YES" in the step S920), the controller 110 copies the data stored in the TG 8, which is the source of the data transport, to the disk device 7, which is the destination of the data transport (S930).

The controller 110 updates each of the virtual volume management table 203, the disk pool management table 204, and the TG pool management table 205 (S940). Specifically, in the virtual volume management table 203, the internal LUN 430 is changed to the internal LUN of the disk device 7, which is the destination of the copy, and the status 450 is changed to ACTIVE. In the disk pool management table 204, the usage flag 530 of the disk device 7, to which the data is transported from the TG 8 of the source of the data transport, is changed from "0" to "1". In the TG pool management table 205, when the data stored in the TG 8 which is the source of the data transport is deleted, the usage flag 620 is changed from "1" to "0". If the data is temporarily moved to the disk device 7, it is not necessary to delete the data stored in the tape device 133.

The controller 110 communicates with the host computer 20, and causes the host computer 20 to update the contents management table 212 (S950). The CPU 21 of the host computer 20 executes the contents management program 211, thereby, in the contents management table 212, changing the status 750 of the content (data) stored in the TG 8, which is the source of the data transport, to "ACTIVE".

Figure 10:
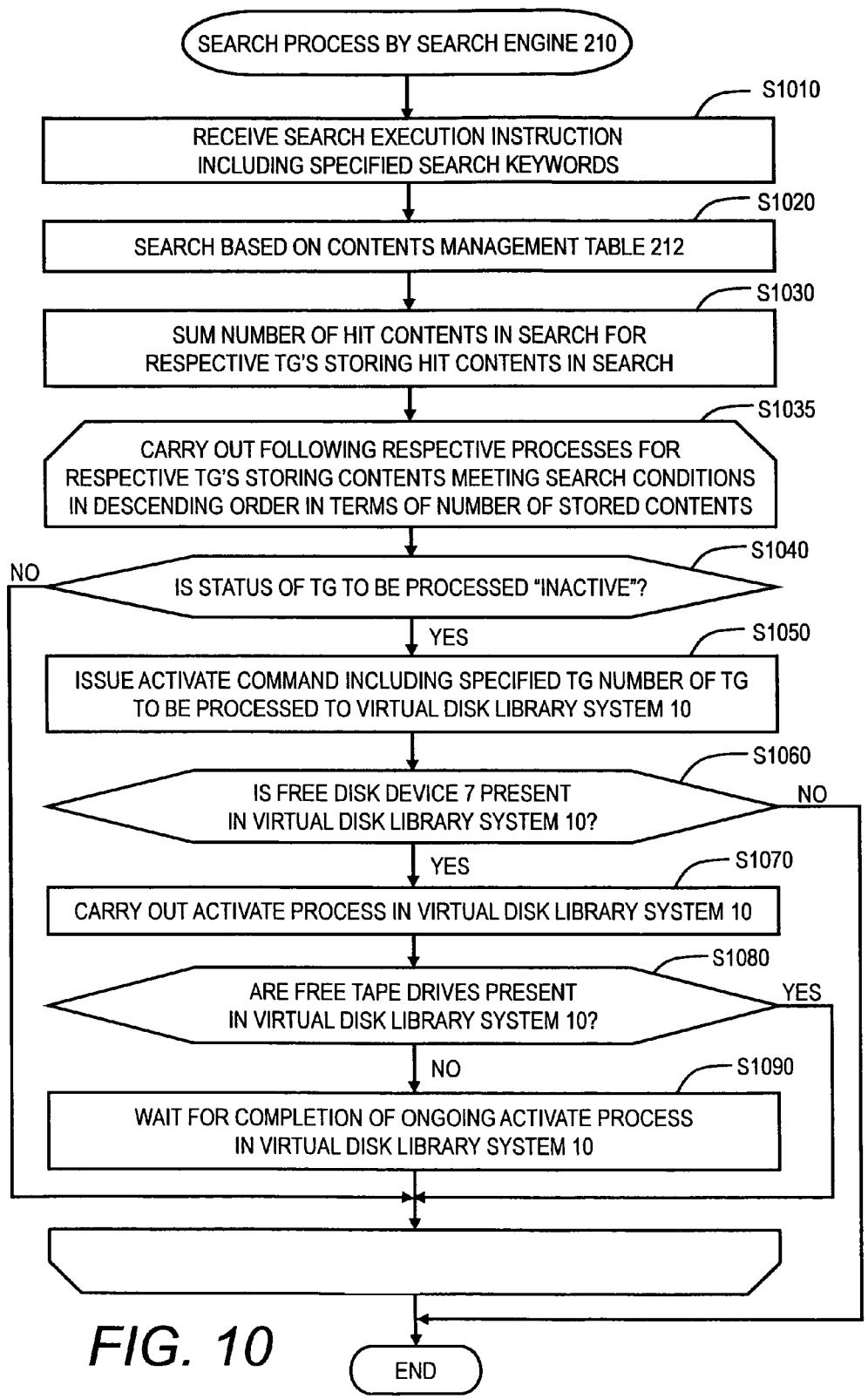
FIG. 10 is a flowchart showing steps of a search process carried out by a search engine in accordance with the embodiment of this invention.

FIG. 10 is a flowchart showing steps of a search process carried out by the search engine 210 according to the embodiment of this invention.

The search process not only searches for data, but also, based on a search result, issues an activate command to the virtual disk library system 10, thereby automatically activating contents meeting search conditions, and thus making the contents available for data access from the host computer 20. It should be noted that the search result is always available for viewing once the search process, which has been carried out for the data (contents), has been completed even before the completion of the activate process.

The CPU 21 of the host computer 20 receives a search execution instruction including specified search keywords (S1010).

The CPU 21 of the host computer 20 causes the search engine 210 to refer to the contents management table 212, and to search for contents including matching keywords 720 (S1020).

The CPU 21 of the host computer 20 sums the number of contents searched by the search engine 210 (contents hit in the search) for respective TG's 8 which store these searched contents (S1030). For example, when the contents management table 212 is in the state shown in FIG. 7, if "KEYWORD A" is specified as a search keyword used for the search in the step S1010, the number of hit contents in TG1 is two, and the number of hit contents in TG4 is 1. A description will be given of a case in which "KEYWORD A" is specified as the search keyword, for example.

The CPU 21 of the host computer 20 carries out the following processes for the respective TG's 8 storing the searched contents in a descending order in terms of the number of the stored contents (S1035).

The CPU 21 of the host computer 20 determines whether the status of a TG 8 to be processed is "INACTIVE" or not (S1040). Specifically, the CPU 21 refers to the contents management table 212, and determines the value of the status 750 of TG1.

If the status 750 is "ACTIVE" ("NO" in the step S1040), the CPU 21 of the host computer 20 caries out the process for the next TG 8 to be processed.

If the status 750 is "INACTIVE" ("YES" in the step S1040), the CPU 21 causes the search engine 210 to issue an activate command, which includes the specified TG number of the TG 8 to be processed, to the virtual disk library system 10 (S1050). In this example, the search engine 210 specifies TG1, and then issues an activate command.

When the controller 110 of the virtual disk library system 10 receives the activate command, the controller 110 determines whether a free disk device 7 to which the data stored in the specified TG 8 can be copied is present or not (S1060).

If a free disk device 7 is not present ("NO" in the step S1060), the controller 110 cannot carry out the staging, thus notifies the host computer 20 of an error, and finishes this process.

If the free disk device 7 is present ("YES" in the step S1060), the controller 110 carries out the activate process shown in FIG. 9 for the specified TG 8 (S1070).

The controller 110 can carry out the activate process in a multiplexed manner up to the number of the tape drivers 132, and the virtual disk library system 10 thus determines whether free tape drives 132 are present (S1080). If a large number of the tape drives 132 are operated in the multiplexed manner, the processing performance may decrease, and it may thus be set a limit to the number of the tape drives 132 to be operated in the multiplexed manner, which number is independent of the number of the tape drives 132.

If free tape drives 132 are not present ("NO" in the step S1080), the controller 110 waits for the completion of the activate process (S1090). If free tape drives 132 are present ("YES" in the step S1080), the controller 110 continues the processes for the next TG 8 to be processed without waiting for the completion of the activate process.

Since the order of the activation of the TG's 8 is established in the step S1030, there may be provided a configuration that this order is transmitted to the virtual disk library system 10 as the priority of the TG's 8, and the controller 110 sequentially activates the TG's 8 according to the received priority.

According to the above series of processes, by issuing an activate command to the virtual disk library system 10 based on a search result, it is possible to automatically carry out the staging for TG's 8 storing contents meeting search conditions, and making the contents available for data access from the host computer 20.

Moreover, it may be provided a configuration that, if a search process is cancelled, the staging may be stopped. In order to detect a cancellation of a search process, a finish of an application program which is carrying out a search process, or a repetition of a search process based on different keywords may be detected, for example.

FIG. 11 shows an example of a screen showing a search result according to the embodiment of this invention.

On the display screen of the search result, contents meeting the search conditions are listed. This list of the contents includes the sizes of data or a file, dates of update, statuses, and the like as well as content names.

According to the embodiment of this invention, when a result of a search is displayed, contents which are stored in virtual volumes 6 in the active state are shown on a higher level. Thus, the contents shown on the higher level can be accessed immediately.

Moreover, by automatically carrying out the staging, when, for example, the staging (activate process) of a content C5 has been completed, the search result display screen is updated so that the content C5 is moved up, and is shown next to a content C80.

It should be noted that, in the search process shown in FIG. 10, the staging is carried out in the descending order in terms of the number of the stored contents meeting the search condition, but the execution order of the staging may be determined by calculating a score for the respective TG's 8 also considering a degree of the matching to the keywords or the like in the step S1035 of FIG. 10.

According to the embodiment of this invention, it is possible to simplify the user steps for making access to data stored in a magnetic tape media from the three steps including the search, the staging, and the data access to the two steps including the search and the data access. Moreover, since it is possible to eliminate an instruction to execute the staging to be issued by an administrator or a user, it is possible to reduce a period required for making access to data.

While the present invention has been described in detail and pictorially in the accompanying drawings, the present invention is not limited to such detail but covers various obvious modifications and equivalent arrangements, which fall within the purview of the appended claims.

What is claimed is:

1. A storage system for storing contents accessed by a host computer, comprising:
   an interface coupled to the host computer;
   a processor coupled the interface;
   a memory coupled to the processor; and
   a storage device for storing the contents, wherein:
   the storage device comprises a plurality of first storage devices in which the contents accessed sequentially from a beginning, and a second storage device in which the contents can be accessed at random;
   the contents stored in the first storage devices are replicated to the second storage device, and the replicated contents is accessed by the host computer;
   wherein the host computer includes a first memory storing a contents management table that includes a plurality of entries, each entry including a respective association between a content item and a corresponding first storage device of the plurality of first storage devices in which the content item is stored;

wherein the host computer is configured to:
receive an input of a query used for content items stored in the storage device;
search the contents management table for entries for which the respective association includes a content item related to the input query;
set a priority to a candidate first storage device of the first storage devices included in at least one entry of the contents management table for which the respective association includes a content item related to the input query based on a quantity of entries of the contents management table for which the respective association includes correspondence between a content item related to the input query and the candidate first storage device; and
instruct the storage system to replicate the contents stored in the candidate first storage device to the second storage device in accordance with the priority; and
wherein the processor is configured to:
receive an indication of the candidate first storage device and the priority of the contents from the host computer; and
replicate the contents stored in the candidate first storage device to the second storage device in accordance with the priority before reception of an access request.

2. The storage system according to claim 1, wherein:
the storage system provides a plurality of logical storage areas used for an access to the contents stored in the storage device;
at least one of the first storage device and the second storage device is allocated to each of the plurality of logical storage areas; and
the processor is further configured to:
replicate contents stored in a first device of the first storage devices to the second storage device upon receiving an access request directed to a storage area to which the first device of the first storage devices is allocated; and
allocate the second storage device to which the data stored in the first storage device has been replicated to the logical storage area to which the received access request is directed.

3. The storage system according to claim 2, wherein the processor is further configured to send the host computer the contents stored in the second storage device in the case of which the second storage device to which the contents stored in the first device of the first storage devices has been replicated is allocated to the storage area to which the received access request is directed.

4. The storage system according to claim 2, wherein the processor is further configured to:
store, in the first device of the first storage devices, the contents stored in the second storage device which is allocated to the logical storage area to which the received access request is directed upon receiving a notice of an end of use of the content items related to the input query from the host computer; and
release the second storage device allocated to the storage area.

5. The storage system according to claim 1, wherein the processor is further configured to stop the replication of the contents stored in the one of the first storage devices to the second storage device in the case of which the processor a new priority from the host processor while replicating the contents stored in the one of the first storage devices to the second storage device.

6. A computer system, comprising:
a host computer; and
a storage system for storing contents accessed by the host computer in a storage device, wherein:
the storage device comprises a plurality of first storage devices in which the contents are accessed sequentially from a beginning, and a second storage device in which the contents can be accessed at random;
the host computer comprises a first interface coupled to the storage system, a first processor coupled to the first interface and a first memory coupled to the first processor, the first memory storing a contents management table that includes a plurality of entries, each entry including a respective association between a content item and a corresponding first storage device of the plurality of first storage devices in which the content item is stored;
the storage system comprises a second interface coupled to the host computer, a second processor coupled to the second interface, and a second memory coupled to the second processor; and
the contents stored in the first storage devices are replicated to the second storage device, and the replicated contents are accessed by the host computer;
wherein the host computer is configured to:
receive an input of a query used for content items stored in the storage device;
search the contents management table for entries for which the respective association includes a content item related to the input query;
set a priority to one of the first storage devices included in at least one entry of the contents management table for which the respective association includes a content item related to the input query based on a quantity of entries of the contents management table for which the respective association includes correspondence between a content item related to the input query and the one of the first storage devices; and
instruct the storage system to replicate the contents stored in the one of the first storage devices to the second storage device in accordance with the priority; and
wherein the storage system is configured to replicate the contents stored in the first storage device to the second storage device in accordance with a replication instruction received from the host computer.

7. The computer system according to claim 6, wherein:
the storage system provides a plurality of logical storage areas used for an access to the contents stored in the storage device;
at least one of the first storage devices and the second storage device is allocated to each of the plurality of logical storage areas; and
the storage system is further configured to:
replicate contents stored in a first device of the first storage devices to the second storage device upon receiving an access request directed to a storage area to which the first device of the first storage devices is allocated; and
allocate the second storage device to which the contents stored in the first device of the first storage devices has been replicated to the logical storage area to which the received access request is directed.

8. The computer system according to claim 7, wherein the storage system is further configured to send the host computer the contents stored in the second storage device in the case of which the second storage device to which the contents stored in the first device of the first storage devices has been replicated is allocated to the storage area to which the received access request is directed.

9. The computer system according to claim 7, wherein the storage system is further configured to:
   store, in the first device of the first storage devices, the contents stored in the second storage device which is allocated to the logical storage area to which the received access request is directed upon receiving a notice of an end of use of the content items related to the input query from the host computer; and
   release the second storage device allocated to the storage area.

10. The computer system according to claim 6, wherein the storage system is further configured to stop the replication of the contents stored in the one of the first storage devices to the second storage device in the case of which the storage system receives a notice of the end of use of the content items related to the input query from the host computer while replicating the contents stored in the one of the first storage devices to the second storage device.

11. The computer system according to claim 6, wherein:
   each association of the contents management table further includes information indicating whether the content item of the association has been replicated to the second storage device; and
   the host computer is further configured to instruct the storage system to replicate the contents stored in the one of the first storage devices to the second storage device in accordance with the contents management table.

12. The computer system according to claim 11, wherein the host computer is further configured to output the contents replicated to the second storage device on a higher level upon displaying a result of the search.

13. A method of processing data in a computer system comprising a host computer, and a storage system for storing contents accessed by the host computer in a storage device,
   the storage device comprising a first storage device in which the contents are accessed sequentially from a beginning, and a second storage device in which the contents can be accessed at random,
   the host computer comprising a first interface coupled to the storage system, a first processor coupled to the first interface, and a first memory coupled to the first processor, the first memory storing a contents management table that includes a plurality of entries, each entry including a respective association between a content item and a corresponding first storage device of the plurality of first storage devices in which the content item is stored,
   the storage system comprising a second interface coupled to the host computer, a second processor coupled to the second interface, and a second memory coupled to the second processor, and
   the contents stored in the first storage devices are replicated to the second storage device, and the replicated contents are accessed by the host computer;
   the method comprising the steps of:
   receiving, by the host computer, an input of a query used for content items stored in the storage device;
   searching, by the host computer, the contents management table for entries for which the respective association includes a content item related to the input query;
   setting, by the host computer, a priority to one of the first storage devices included in at least one entry of the contents management table for which the respective association includes a content item related to the input query based on a quantity of entries of the contents management table for which the respective association includes correspondence between a content item related to the input query and the one of the first storage devices;
   instructing, by the host computer, the storage system to replicate the contents stored in the one of the first storage devices to the second storage device in accordance with the priority; and
   replicating, by the storage system, the contents stored in the first storage device to the second storage device in accordance with a replication instruction received from the host computer.

* * * * *